(12) United States Patent
Yu

(10) Patent No.: US 8,806,407 B2
(45) Date of Patent: Aug. 12, 2014

(54) MULTIPLE-INSTANTIATED-MODULE (MIM) AWARE PIN ASSIGNMENT

(71) Applicant: Synopsys, Inc., Mountain View, CA (US)

(72) Inventor: Zhengtao Yu, Cary, NC (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/753,103

(22) Filed: Jan. 29, 2013

(65) Prior Publication Data

US 2014/0189632 A1 Jul. 3, 2014

Related U.S. Application Data

(60) Provisional application No. 61/747,987, filed on Dec. 31, 2012.

(51) Int. Cl.
*G06F 17/50* (2006.01)

(52) U.S. Cl.
USPC .......................................................... 716/130

(58) Field of Classification Search
USPC .......................................................... 716/130
See application file for complete search history.

(56) References Cited

U.S. PATENT DOCUMENTS

| 5,838,583 | A | 11/1998 | Varadarajan et al. | |
| 8,065,642 | B1 | 11/2011 | Corbett | |
| 8,261,233 | B2 | 9/2012 | Szpak et al. | |
| 8,448,113 | B2 | 5/2013 | Amundson et al. | |
| 8,470,613 | B2 | 6/2013 | Von Kaenel | |
| 2010/0042955 | A1* | 2/2010 | Kotecha et al. | 716/2 |
| 2011/0055788 | A1* | 3/2011 | Gao | 716/130 |
| 2011/0055790 | A1* | 3/2011 | Gao | 716/130 |
| 2011/0185329 | A1* | 7/2011 | Wen et al. | 716/130 |
| 2012/0036491 | A1* | 2/2012 | Ramji et al. | 716/122 |

* cited by examiner

*Primary Examiner* — Thuan Do
*Assistant Examiner* — Mohammed Alam
(74) *Attorney, Agent, or Firm* — Park, Vaughan, Fleming & Dowler LLP; Laxman Sahasrabuddhe

(57) ABSTRACT

Systems and techniques for multiple-instantiated-module (MIM)-aware pin assignment are described. An aggregate cost function can be determined, wherein the aggregate cost function is aggregated across all instances of an MIM for placing a pin at a particular location on the boundary of the MIM. The aggregate cost function can then be used by a pin assignment engine to place the pin in the MIM. A pin assignment engine can place one pin at a time, or place multiple pins at a time by trying to optimize the aggregate cost over multiple pins. Some embodiments can propagate pin-alignment constraints through one or more instances of one or more MIMs in the circuit design layout, and then perform pin assignment while observing the pin-alignment constraints. In some embodiments, pin assignment can be performed on MIMs in decreasing order of the number of pin-alignment constraints that are imposed on the MIMs.

24 Claims, 5 Drawing Sheets

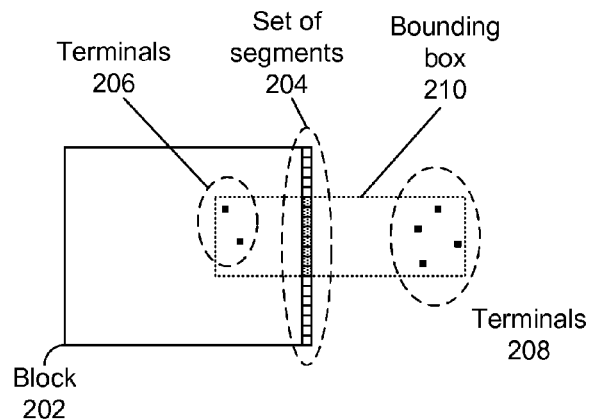
FIG. 2B
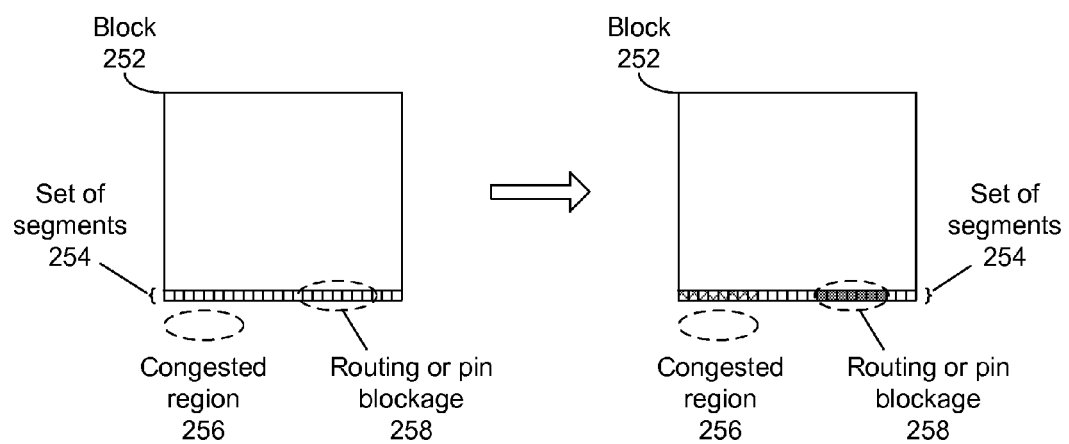
FIG. 2C             FIG. 2D

MULTIPLE-INSTANTIATED-MODULE (MIM) AWARE PIN ASSIGNMENT

RELATED APPLICATION

This application claims priority to U.S. Provisional Application Ser. No. 61/747,987, by Zhengtao Yu, filed on 31 Dec. 2012, the contents of which are herein incorporated by reference in their entirety.

BACKGROUND

1. Technical Field

This disclosure relates to electronic design automation (EDA). More specifically, this disclosure relates to multiple-instantiated-module (MIM) aware pin assignment.

2. Related Art

Pin assignment (also known as pin placement) refers to the process of assigning pin locations to a partition or a block in the circuit design. A partition is a portion of the circuit design (a partition typically includes the details of the cells that are within the partition). A partition is not associated with a physical area in the chip, and a graphical user interface (GUI) of a floorplanning tool does not typically treat a partition as a floorplan object that can be graphically manipulated in the floorplan. A block, on the other hand, is a physical area in the circuit design layout that includes a portion of the circuit design. A GUI of a floorplanning tool can treat a block as a floorplan object that can be placed, and the GUI can be used to perform various graphical operations (e.g., moving, sizing, changing the shape) on the block.

Pin assignment can be performed on a partition or a block. The pins on the boundaries of a partition or a block are electrically connected to one or more cells within the partition or block. A terminal (e.g., an input or an output of a cell) in the partition or the block that needs to be electrically connected to another terminal that is outside the partition or block (e.g., an input of another cell in another partition or block) must pass through a pin in the partition or block.

SUMMARY

Some embodiments described herein provide systems and techniques for MIM-aware pin assignment. A module is an arbitrary portion of a circuit design, and can be a partition or a block. A circuit design can include multiple instances of the same module, and such a module is called a multiple-instantiated-module or MIM for short (the term multiple-instantiated-block, or MIB for short, can also be used to refer to an MIM). It is desirable to have the same pin assignment across multiple instances of the MIM. The optimal pin assignment for a particular MIM instance depends on the context around the MIM instance. Some embodiments described herein are capable of performing pin assignment that is valid and substantially optimal across multiple MIM instances.

Specifically, some embodiments determine an aggregate cost function that is aggregated across all instances of an MIM for placing a pin at a particular location on the boundary of the MIM. The aggregate cost function is then used by a pin assignment engine to place the pin in the MIM. For example, the pin assignment engine can use a router to route a net, and select a pin location based on where the net crosses the MIM boundary. The router can use the aggregate cost function as one of the cost components in the overall cost function that the router tries to optimize while routing the net. A pin assignment engine can place one pin at a time, or place multiple pins at a time by trying to optimize the aggregate cost over multiple pins.

Some embodiments take into consideration pin-alignment constraints when performing pin assignment. Specifically, pin-alignment constraints can be propagated through one or more instances of one or more MIMs in the circuit design layout, and then pin assignment can be performed while observing the pin-alignment constraints. In some embodiments, pin assignment can be performed on MIMs in decreasing order of the number of pin-alignment constraints that are imposed on the MIMs, i.e., MIMs that have more pin-alignment constraints are processed before the MIMs that have fewer pin-alignment constraints.

BRIEF DESCRIPTION OF THE FIGURES

FIG. 2A-2B illustrate how a bounding box around a net can be used to assign costs to segments on the boundary of the partition or block in accordance with some embodiments described herein.

FIGS. 2C-2D illustrate how a boundary-wire-length cost can depend on routing or pin blockages and/or congested regions in accordance with some embodiments described herein.

DETAILED DESCRIPTION

Figure 1:
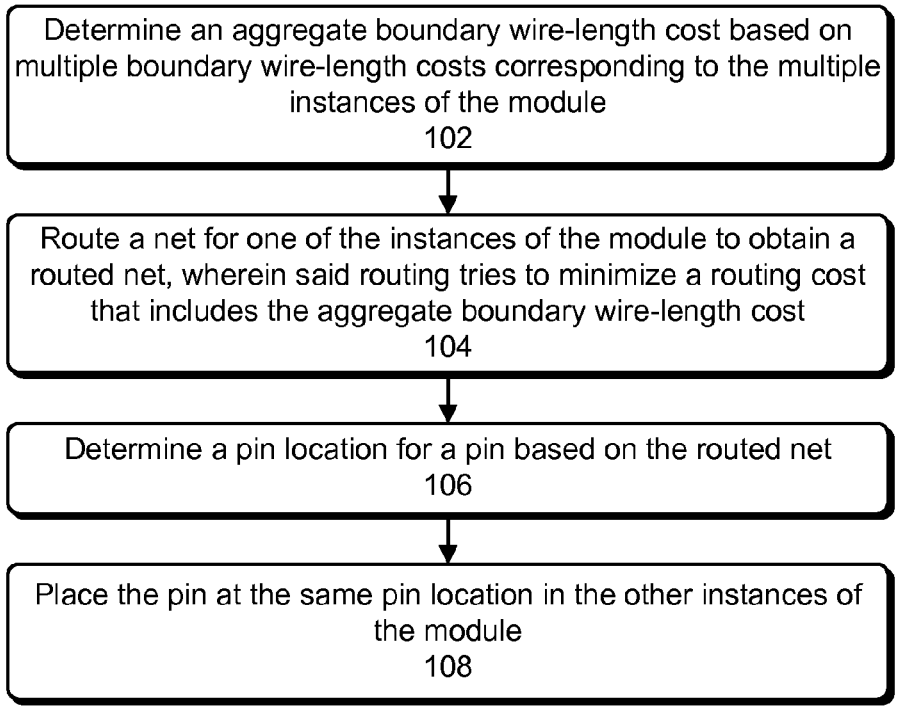
FIG. 1 presents a flowchart that illustrates a process for MIM-aware pin assignment in accordance with some embodiments described herein.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview of an Electronic Design Automation (EDA) Flow

An EDA flow can be used to create a circuit design. Once the circuit design is finalized, it can undergo fabrication, packaging, and assembly to produce integrated circuit chips. An EDA flow can include multiple steps, and each step can involve using one or more EDA software tools. Some EDA steps and software tools are described below. These examples of EDA steps and software tools are illustrative purposes only and are not intended to limit the embodiments to the forms disclosed.

Some EDA software tools enable circuit designers to describe the functionality that they want to implement. These tools also enable circuit designers to perform what-if planning to refine functionality, check costs, etc. During logic design and functional verification, the HDL (hardware description language), e.g., SystemVerilog, code can be written and the design can be checked for functional accuracy, e.g., the design can be checked to ensure that it produces the correct outputs.

During synthesis and design for test, the HDL code can be translated to a netlist using one or more EDA software tools. Further, the netlist can be optimized for the target technology, and tests can be designed and implemented to check the finished chips. During netlist verification, the netlist can be checked for compliance with timing constraints and for correspondence with the HDL code.

During design planning, an overall floorplan for the chip can be constructed and analyzed for timing and top-level routing. During physical implementation, circuit elements can be positioned in the layout (placement) and can be electrically coupled (routing).

During analysis and extraction, the circuit's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped-out" to produce masks which are used during fabrication.

MIM-Aware Pin Assignment

A set of pin locations for a partition or a block can be determined by performing global routing on the circuit design layout, and then creating pins at locations where wires in the global routing solution cross boundaries of the partition or the block.

A module is an arbitrary portion of a circuit design that includes circuitry for performing a particular function or a particular set of functions. A processor core is an example of a module. A circuit design can include multiple instances of the same module. Each instance of a module can either be a partition or a block. Different instances of a module can have the same or different orientations, e.g., an instance of a module may be a rotated and/or a mirror image of another instance.

It is desirable to have the same pin assignment for multiple instances of the module. The term "same pin assignment" means that the pin assignments are the same with respect to the other circuit elements in the module instance. Therefore, if two module instances have the same pin assignment, and if these two module instances are rotated and/or mirrored versions of each other, then the pin locations on these two module instances will also be correspondingly rotated and/or mirrored versions of each other.

The optimal pin assignment for a given instance of the module depends on the context of the module instance. For example, the pin assignment for a given instance may depend on the partitions and/or blocks that are in proximity to the module instance and the target terminals (a terminal is a pin of a circuit element, e.g., the input or the output of an AND gate) that need to be electrically connected to one or more terminals in the module instance. Some embodiments described herein enable pin assignment that is valid and substantially optimal across multiple instances of a module.

FIG. 1 presents a flowchart that illustrates a process for MIM-aware pin assignment in accordance with some embodiments described herein. The process can begin with determining an aggregate boundary-wire-length cost based on multiple boundary-wire-length costs corresponding to the multiple instances of the module (operation 102). A boundary-wire-length cost associates each point on the boundary of the partition or a block with a cost. When a router routes a net, the cost associated with the point on the boundary where the net crosses the boundary is used as one of the cost components in the overall cost associated with the net. The router typically searches for a routing solution for the net that minimizes the overall cost associated with the net.

In some embodiments, a boundary-wire-length cost can be associated with each point on the boundary as follows. The boundary of the partition or the block can be divided into segments. Each segment can then be associated with a cost. Given a point on the boundary of the partition or block, the router can determine the segment in which the point is located, and the cost associated with the segment can then be used as the cost for the point.

In some embodiments, a cost can be associated with each segment as follows. A bounding box can be constructed around the net. The segments that are within the bounding box can be assigned a low cost, and the segments that are outside the bounding box can be assigned a high cost. The segments that are within (or outside) the bounding may be assigned the same cost (i.e., a constant low cost for segments within the bounding box, and a constant high cost for segments outside the bounding box) or different costs (e.g., a low cost for the segments within the bounding box that has a variable component that depends on the specific location of the segment within the bounding box).

Figure 2A:
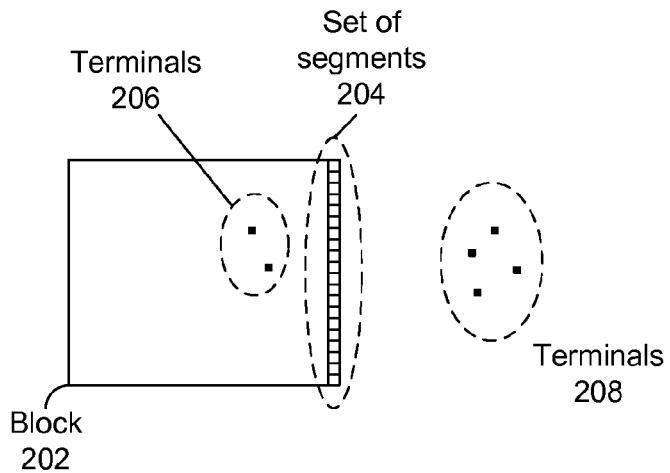

FIG. 2A-2B illustrate how a bounding box around a net can be used to assign costs to segments on the boundary of the partition or block in accordance with some embodiments described herein. In FIG. 2A, the boundary of block 202 has been divided into a set of segments 204 (only the segments on the right edge are shown in FIGS. 2A-2B; the other edges of block 202 can each be similarly divided into a set of segments). Each segment is depicted as a square on the right edge of block 202. The segments can have the same size or they can have different sizes. In some embodiments, each square can correspond to a g-cell that is used by a global router to determine global routes for nets. Suppose a boundary-wire-length cost is to be determined for routing a net that electrically connects terminals 206 and 208 with each other. FIG. 2B shows bounding box 210 that has been created based on the locations of terminals 206 and 208. The term "bounding box" generally refers to any closed region in the layout that encloses all of the pins of the net that is desired to be routed. As shown in FIG. 2B, the segments that are within the bounding box (shaded squares in FIG. 2B) can be assigned a low cost and the segments that are outside the bounding box can be assigned a high cost.

The boundary-wire-length cost associated with a point on the boundary can be based on factors other than wire length. For example, the boundary-wire-length cost at a point can also depend on blockages and/or congestion. FIGS. 2C-2D illustrate how a boundary-wire-length cost can depend on routing or pin blockages and/or congested regions in accordance with some embodiments described herein. In FIG. 2C, the boundary of block 252 has been divided into a set of segments 254 (only the segments on the bottom edge are shown in FIGS. 2C-2D; the other edges of block 252 can each be similarly divided into a set of segments).

Certain regions in the layout may be identified as congested regions by an EDA tool. For example, an EDA tool can determine a routing solution for the layout (e.g., by using a fast and approximate routing technique) and identify congested regions (e.g., congested region 256) where the ratio between the number of wires that are routed through the region and the available routing resources in the region is greater than a predetermined threshold (e.g., 0.9). Certain regions in the layout may have routing or pin blockages. A routing blockage is a region in the layout (the region may be identified by a user or automatically identified by an EDA tool) that is to be avoided during routing, i.e., no wires are allowed to be routed through the routing blockage. Likewise, one or more portions of the partition or block's boundary can have pin blockages (again, these portions may be identified by a user or automatically identified by an EDA tool), i.e., no pins are to be placed in the identified portions of the partition or block's boundary.

The segments on the partition or block's boundary can be assigned a boundary-wire-length cost based on congestion and/or blockages. For example, as shown in FIG. 2C, congested region 256 and routing or pin blockage 258 have been identified for block 252. FIG. 2D shows that the pins (shown as shaded squares) in proximity to congested region 256 have been assigned a high cost. Likewise, the pins (also shown as shaded squares, albeit with a different shading) that are in the portion of block 252's boundary that has been identified as having a routing or pin blockage have also been assigned a high cost. The cost assigned to segments that are in proximity to congested regions can be the same or different from the cost assigned to segments that are in proximity to routing and/or pin blockages.

Figure 2E:
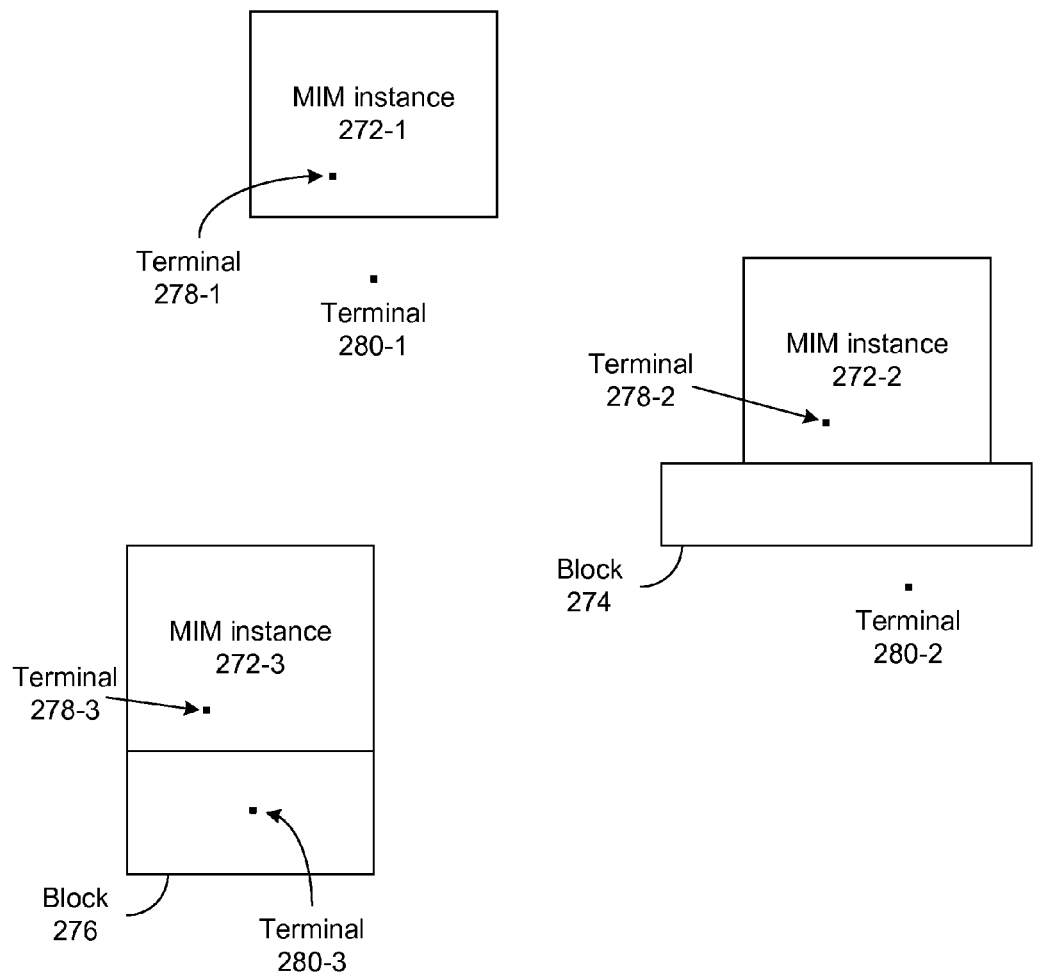
FIG. 2E illustrates how a boundary-wire-length cost can capture an abutting block constraint in accordance with some embodiments described herein.

Some MIM instances may have one or more abutting blocks while other MIM instances may not. Therefore, during pin assignment, it is important to determine if there are any constraints because of abutting blocks. Some embodiments can capture such abutting block constraints using the boundary-wire-length cost. FIG. 2E illustrates how a boundary-wire-length cost can capture an abutting block constraint in accordance with some embodiments described herein. The layout shown in FIG. 2E includes multiple MIM instances, namely MIM instances 272-1, 272-2, and 272-3. Blocks 274 and 276 abut MIM instances 272-2 and 272-3, respectively. Each MIM instance includes a terminal that is to be electrically connected with another terminal outside the MIM instance. Specifically, terminals 278-1, 278-2, and 278-3 need to be electrically connected with terminals 280-1, 280-2, and 280-3, respectively.

If we consider MIM instance 272-1 in isolation, then a wire can be routed between terminal 278-1 and terminal 280-1 that passes through the bottom edge of MIM instance 272-1, and a pin can be located at the point where this wire crosses the bottom edge of MIM instance 272-1. However, if we consider the other MIM instances, then we may arrive at a different conclusion. Specifically, since block 274 abuts the bottom edge of MIM instance 272-2, we may not be able to place a pin on the bottom edge of MIM instance 272-2 if feed-through is not allowed. When "feed-through" routes are allowed, a net can be routed through a block even though the net does not electrically connect a terminal within the block. The net enters the block via one pin on one of the block boundaries and exits the block via another pin on another block boundary. If feed-through routes are not allowed, a pin can be added to the left/top/right edge of MIM instance 272-2, and a wire can be routed from the pin and around block 274 to electrically connect terminal 278-2 with terminal 280-2.

The situation in MIM instance 272-3 is slightly different from the situation in MIM instance 272-2. Terminal 278-3 in MIM instance 272-3 needs to be electrically connected with terminal 280-3 that is within block 276 that abuts MIM instance 272-3. In some embodiments, a so-called "abutting pin" may be allowed on the common edge of two abutting blocks. In such embodiments, a pin can be located on the bottom edge of MIM instance 272-3. However, if abutting pins are not allowed, then the bottom edge of MIM instance 272-3 is also forbidden for placing pins, and a wire can be routed between a pin on the left/top/right edge of MIM instance 272-3 and a corresponding pin on the left/bottom/right edge of block 276 to electrically connect terminal 278-3 with terminal 280-3.

If pin assignment cannot be performed on a particular edge or on a part of a particular edge of an MIM instance because of an abutting block constraint (e.g., the situation with MIM instances 272-2 and/or 272-3), then a high boundary-wire-length cost can be assigned to the corresponding segments on that particular edge. For example, segments in the bottom edge of MIM instances 272-2 and 272-3 shown in FIG. 2E can be assigned a high boundary-wire-length cost to model the abutting block constraints. In some embodiments, the segments in the bottom edge of MIM instance 272-1 is not assigned a high boundary-wire-length cost because MIM instance 272-1 does not have an abutting block constraint along its bottom edge. As explained below, when pin assignment is performed, an aggregate boundary-wire-length cost is derived from the boundary-wire-length costs of the individual MIM instances to capture abutting block constraints over all MIM instances.

The boundary-wire-length cost that is assigned to a segment of an MIM instance can be based on different boundary-wire-length cost components that are determined based on different types of constraints, e.g., bounding box, congestion, routing blockages, pin blockages, and/or abutting block constraints. For example, in some embodiments, the boundary-wire-length cost that is assigned to a segment can be the maximum of the different boundary-wire-length cost components. In other words, if there are M different cost components (e.g., cost components based on bounding box, congestion, routing blockage, pin blockage, abutting blocks, etc.), then $$C(p) = \max_{1 \leq j \leq M} (C_j(p)),$$

where C(p) is the boundary-wire-length cost at point (or segment) p on the boundary of a given MIM instance, and $C_j(p)$ is the contribution of the $j^{th}$ cost component, $1 \leq j \leq M$. In another embodiment, the boundary-wire-length cost can be a sum (with equal or different weights) of the different cost components. For the equal weight case, the boundary-wire-length cost for a given point (or segment) can be expressed as $$C(p) = \sum_{j=1}^{M} C_j(p),$$

where C(p) is the boundary-wire-length cost at point (or segment) p on the boundary, and $C_j(p)$ is the contribution of the $j^{th}$ cost component, $1 \leq j \leq M$.

The above-described techniques for assigning costs to the different segments of an MIM instance have been presented for illustration purposes only and are not intended to limit the scope of the embodiments described herein. In general, the points (or segments) on the boundary of a partition or block can be assigned any cost that helps the router to determine a valid route for the net that avoids blockages, avoids congested areas, does not violate any abutting block constraints, and minimizes the overall wire length of the net.

An aggregate boundary-wire-length cost can be determined based on the boundary-wire-length costs for the individual MIM instances. In some embodiments, for a given point on the boundary, the maximum boundary-wire-length cost over all MIM instances can be assigned as the aggregate boundary-wire-length cost. In other words, if there are N instances of the MIM, then $$C_{Agg}(p) = \max_{1 \leq i \leq N}(C_i(p)),$$

where $C_{Agg}(p)$ is the aggregate boundary-wire-length cost at point (or segment) p on the boundary, and $C_i(p)$ is the boundary-wire-length cost at point (or segment) p for MIM instance i, where $1 \leq i \leq N$. Other techniques for determining the aggregate boundary-wire-length cost will be apparent to those skilled in the art. For example, in some embodiments, the boundary-wire-length costs corresponding to the multiple MIM instances can be summed (with equal or different weights) to obtain the aggregate boundary-wire-length cost for a given point. For the equal weight case, the aggregate boundary-wire-length cost for a given point (or segment) can be expressed as $$C_{Agg}(p) = \sum_{i=1}^{N} C_i(p),$$

where $C_{Agg}(p)$ is the aggregate boundary-wire-length cost at point (or segment) p on the boundary, and $C_i(p)$ is the boundary-wire-length cost at point p for MIM instance i, where $1 \leq i \leq N$.

When a router routes a net, the router tries to minimize a cost function. The segment through which the net crosses the boundary of the partition or block determines the contribution of the aggregate boundary-wire-length cost to the overall cost function that the router tries to minimize. Note that the aggregate boundary-wire-length cost captures the context around all of the MIM instances that were used to compute the aggregate boundary-wire-length cost. Therefore, when the router routes a net in a particular MIM instance, the router simultaneously optimizes the net over all of these MIM instances.

Once the aggregate boundary-wire-length cost has been determined, a net can be routed for one of the instances of the module to obtain a routed net, wherein said routing tries to minimize a routing cost function that includes the aggregate boundary-wire-length cost (operation 104 in FIG. 1).

A pin location can then be determined based on the routed net (operation 106). Specifically, the pin is located in the segment on the boundary of the partition or block through which the net was routed. In some embodiments, multiple pin locations may be available within a segment. For example, if a segment corresponds to a g-cell that includes multiple wire tracks, then each wire track is a candidate pin location. In these embodiments, the system may select one of the available wire tracks, or may select a wire track based on an alignment constraint—e.g., if the pin is to be aligned with another pin from another partition or block that has already been assigned to a particular wire track, then the pin in the current partition or block on which pin assignment is being performed can be located on the same wire track.

Once the pin location has been determined for one of the module instances, the pin can then be placed at the same pin location in the other instances of the module (operation 108).

Pin-Alignment Considerations

A pin-alignment constraint is a constraint that requires two pins in two different partitions or blocks to be aligned with each other, i.e., the two pins must be assigned to the same wire track so that a straight wire route can be used to electrically connect these two pins. If a pin on one of the MIM instances has a pin-alignment constraint, then this constraint fixes the pin location for all MIM instances. Moreover, since a layout can have multiple MIMs, each having multiple instances, the pin-alignment constraint may need to be propagated from one set of MIM instances to another set of MIM instances.

Figure 3:
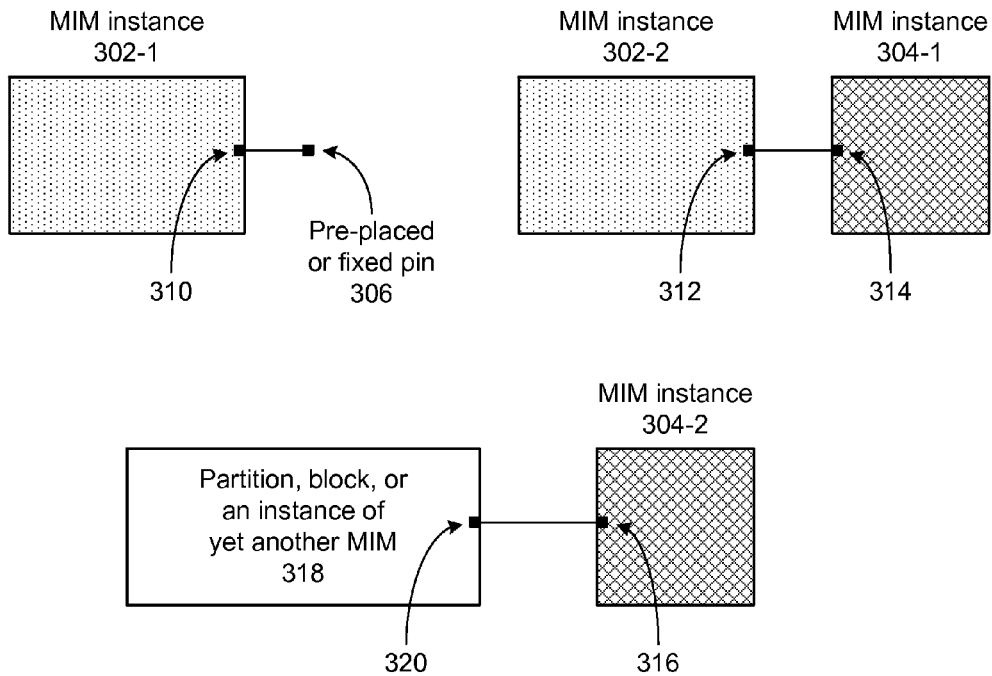
FIG. 3 illustrates the propagation of a pin-alignment constraint in accordance with some embodiments described herein.

FIG. 3 illustrates the propagation of a pin-alignment constraint in accordance with some embodiments described herein. MIM instances 302-1 and 302-2 correspond to a first MIM, and MIM instances 304-1 and 304-2 correspond to a second MIM (which is different from the first MIM). Suppose pin 306 is a pre-placed or a fixed pin that imposes a pin-alignment constraint on pin 310 of MIM instance 302-1. FIG. 3 shows that these two pins have been electrically connected with each other using a straight wire. This pin-alignment constraint needs to be propagated to the other MIM instances, e.g., pin 312 of MIM instance 302-2 corresponds to pin 310 of MIM instance 302-1, and therefore must be located in the same location as pin 310. Furthermore, pin 312 of MIM instance 302-2 is to be electrically connected to pin 314 of MIM instance 304-1, and therefore pin 312 imposes a pin-alignment constraint on pin 314.

The pin-alignment constraint on MIM instance 304-1 can then be propagated to other instances, e.g., to MIM instance 304-2. Specifically, pin 316 of MIM instance 304-2 will be placed at same location as corresponding pin 314 of MIM instance 304-1. Pin 316, in turn, can impose a pin-alignment constraint on partition, block, or an instance of yet another MIM 318, i.e., pin 320 needs to be aligned with pin 316 (e.g., these two pins need to be assigned to the same wire track).

Note that the pin-alignment constraint that originated from pre-placed or fixed pin 306 has been propagated through MIM instances 302-1, 302-2, 304-1, 304-2, and is now being imposed on partition, block, or an instance of yet another MIM 318. In this manner, the pin-alignment constraint can be propagated through multiple sets of MIM instances in the circuit design layout. Specifically, some embodiments can identify an initial set of pin-alignment constraints in the circuit design layout. Next, the pin-alignment constraints can be propagated throughout the circuit design layout as explained in reference to FIG. 3. Once all of the pin-alignment constraints have been propagated, the embodiments can perform pin assignment. Specifically, an embodiment can begin by performing pin assignment on the MIM that is most constrained (e.g., that has the greatest number of pins with a pin-alignment constraint). Once pin assignment on the most constrained MIM is completed, the embodiment can then perform pin assignment on the next most constrained MIM, and so forth.

Figure 4:
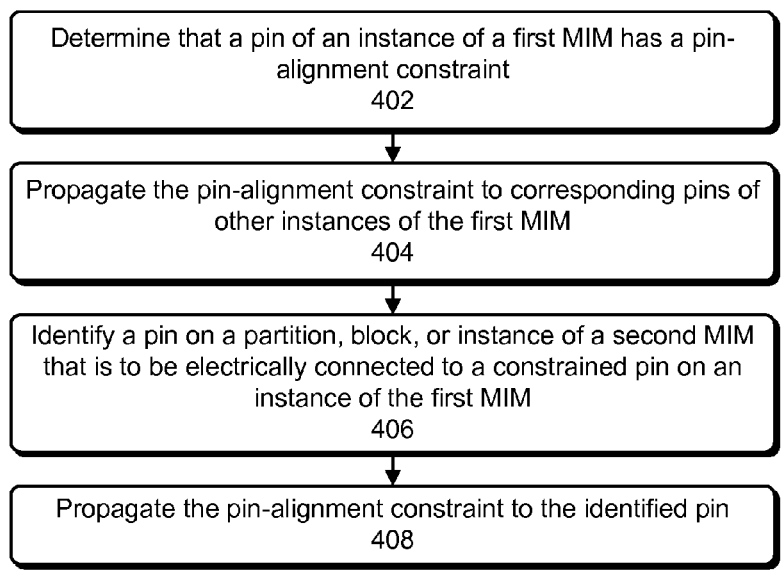
FIG. 4 presents a flowchart that illustrates a process for propagating pin-alignment constraints in accordance with some embodiments described herein.

FIG. 4 presents a flowchart that illustrates a process for propagating pin-alignment constraints in accordance with some embodiments described herein. The process can begin with determining that a pin of an instance of a first MIM has a pin-alignment constraint (operation 402), e.g., the process can determine that pin 310 of MIM instance 302-1 has a pin-alignment constraint. Next, the pin-alignment constraint can be propagated to corresponding pins of other instances of the first MIM (operation 404), e.g., the pin-alignment constraint can be propagated to pin 312 of MIM instance 302-2. The process can then identify a pin on a partition, block, or instance of a second MIM that is to be electrically connected to a constrained pin on an instance of the first MIM (operation 406), e.g., the process can identify pin 314 of MIM instance 304-1 that is to be electrically connected to pin 312 of MIM instance 302-2. Next, the pin-alignment constraint can be propagated to the identified pin (operation 408), e.g., the pin-alignment constraint can be imposed on pin 314.

Figure 5:
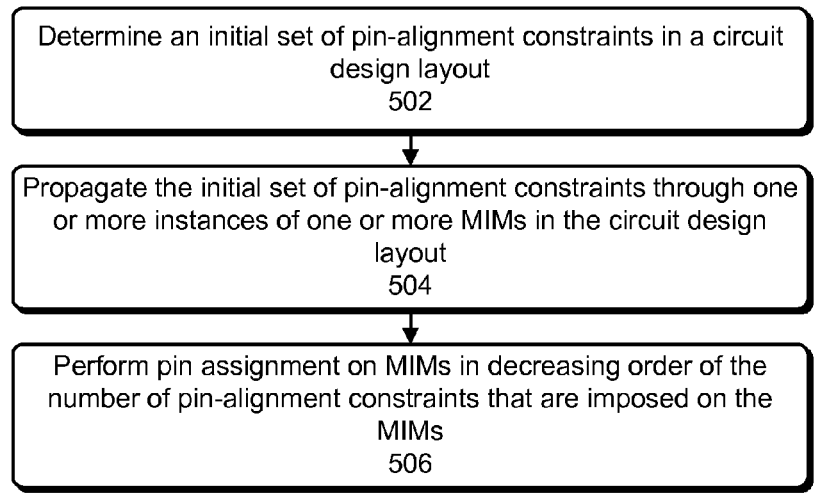
FIG. 5 presents a flowchart that illustrates a process for performing MIM-aware pin assignment in accordance with some embodiments described herein.

In some embodiments, once the pin-alignment constraints have been propagated throughout the circuit design layout, the MIM that has the most number of pin-alignment constraints can be selected for pin assignment. Once the pin assignment has been performed for the most constrained MIM, the embodiments can then select the next most constrained MIM, and so forth. FIG. 5 presents a flowchart that illustrates a process for performing MIM-aware pin assignment in accordance with some embodiments described herein. The process can begin with determining an initial set of pin-alignment constraints in a circuit design layout (operation 502). Next, the process can propagate the initial set of pin-alignment constraints through one or more instances of one or more MIMs (operation 504). The process can then perform pin assignment on MIMs in decreasing order of the number of pin-alignment constraints that are imposed on the MIMs (operation 506), i.e., pin assignment is performed on MIM M1 before it is performed on MIM M2 if MIM M1 has more pin-alignment constraints than MIM M2.

In some embodiments, the pin-assignment process can determine a set of two-pin nets (a two-pin net is a net that electrically connects one pin on one MIM instance with another pin on another partition, block, or MIM instance) where the two pins need to be aligned. Next, the pin-assignment process can propagate the pin-alignment constraints through the circuit design layout as explained above. The pin-assignment process can then simultaneously place all of the pins that have the pin-alignment constraint. By placing these pins simultaneously, the pin-assignment process avoids situations where a pin-alignment constraint conflicts with another constraint, such as a congestion constraint, a routing blockage constraint, or a pin blockage constraint.

Computer System

Figure 6:
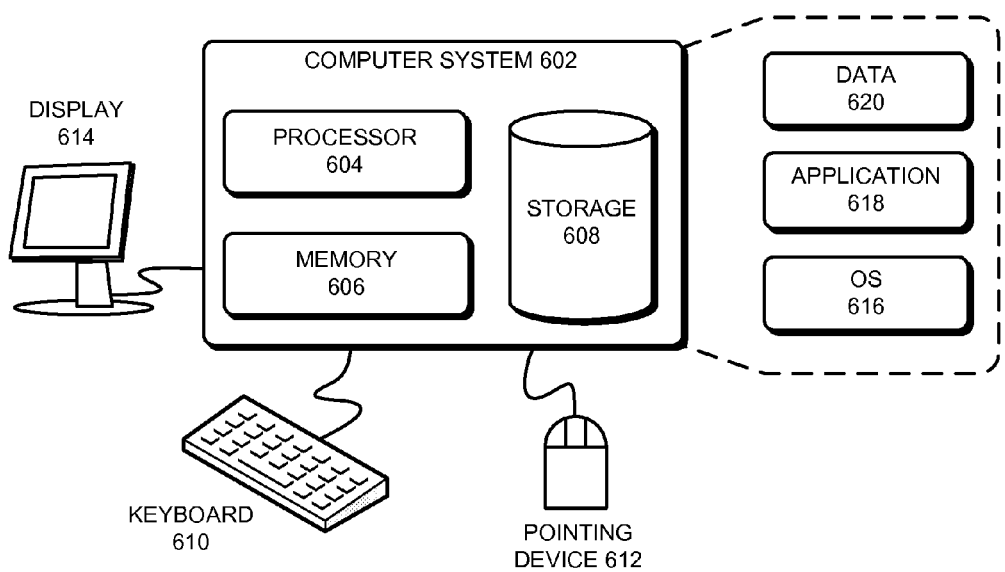
FIG. 6 illustrates a computer system in accordance with some embodiments described in this disclosure.

FIG. 6 illustrates a computer system in accordance with some embodiments described in this disclosure. Computer system 602 can include processor 604, memory 606, and storage device 608. Computer system 602 can be coupled to display device 614, keyboard 610, and pointing device 612. Storage device 608 can store operating system 616, application 618, and data 620. Data 620 can include input required by application 618 and/or output generated by application 618.

Computer system 602 may automatically (or with user intervention) perform one or more operations that are implicitly or explicitly described in this disclosure. For example, computer system 602 can load application 618 into memory 606, and application 618 can then be used to perform MIM-aware pin assignment.

CONCLUSION

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing multiple-instantiated-module (MIM) aware pin assignment, the method comprising:
    determining an aggregate boundary-wire-length cost based on multiple boundary-wire-length costs corresponding to multiple instances of an MIM in a circuit design layout, wherein the MIM is a module that is instantiated at multiple locations in the circuit design layout;
    routing, by computer, a net for one of the instances of the module to obtain a routed net, wherein said routing tries to minimize a routing cost function that includes the aggregate boundary-wire-length cost;
    determining a pin location for a pin based on the routed net; and
    placing the pin at the pin location in the multiple instances of the MIM.

2. The method of claim 1, wherein the aggregate boundary-wire-length cost is equal to the maximum of the multiple boundary-wire-length costs.

3. The method of claim 1, wherein the aggregate boundary-wire-length cost is equal to a weighted sum of the multiple boundary-wire-length costs.

4. The method of claim 1, wherein each boundary-wire-length cost is based on a set of cost components that include one or more of: a bounding box cost component, a congestion cost component, a routing blockage cost component, and a pin blockage cost component.

5. The method of claim 4, wherein each boundary-wire-length cost is equal to the maximum of the set of cost components.

6. The method of claim 4, wherein each boundary-wire-length cost is equal to a weighted sum of the set of cost components.

7. A non-transitory computer-readable storage medium storing instructions that, when executed by a computer, cause the computer to perform a method for performing multiple-instantiated-module (MIM) aware pin assignment, the method comprising:
- determining an aggregate boundary-wire-length cost based on multiple boundary-wire-length costs corresponding to multiple instances of an MIM in a circuit design layout, wherein the MIM is a module that is instantiated at multiple locations in the circuit design layout;
- routing a net for one of the instances of the MIM to obtain a routed net, wherein said routing tries to minimize a routing cost function that includes the aggregate boundary-wire-length cost;
- determining a pin location for a pin based on the routed net; and
- placing the pin at the pin location in the multiple instances of the MIM.

8. The non-transitory computer-readable storage medium of claim 7, wherein the aggregate boundary-wire-length cost is equal to the maximum of the multiple boundary-wire-length costs.

9. The non-transitory computer-readable storage medium of claim 7, wherein the aggregate boundary-wire-length cost is equal to a weighted sum of the multiple boundary-wire-length costs.

10. The non-transitory computer-readable storage medium of claim 7, wherein each boundary-wire-length cost is based on a set of cost components that include one or more of: a bounding box cost component, a congestion cost component, a routing blockage cost component, and a pin blockage cost component.

11. The non-transitory computer-readable storage medium of claim 10, wherein each boundary-wire-length cost is equal to the maximum of the set of cost components.

12. The non-transitory computer-readable storage medium of claim 10, wherein each boundary-wire-length cost is equal to a weighted sum of the set of cost components.

13. A method for performing multiple-instantiated-module (MIM) aware pin assignment, the method comprising:
- determining an initial set of pin-alignment constraints in a circuit design layout;
- propagating, by computer, the initial set of pin-alignment constraints through one or more instances of one or more MIMs in the circuit design layout, wherein the MIM is a module that is instantiated at multiple locations in the circuit design layout; and
- performing pin assignment on MIMs in decreasing order of the number of pin-alignment constraints that are imposed on the MIMs.

14. The method of claim 13, wherein said propagating involves:
- determining that a first pin of a first instance of a first MIM has a pin-alignment constraint;
- propagating the pin-alignment constraint to a second pin of a second instance of the first MIM that corresponds to the first pin;
- identifying a third pin on a partition, a block, or an instance of a second MIM that is to be electrically connected to the second pin; and
- propagating the pin-alignment constraint to the third pin.

15. An apparatus, comprising:
- a processor; and
- a non-transitory storage medium storing instructions that, when executed by the processor, cause the apparatus to perform a method for performing multiple-instantiated-module (MIM) aware pin assignment, the method comprising:
  - determining an aggregate boundary-wire-length cost based on multiple boundary-wire-length costs corresponding to multiple instances of a MIM in a circuit design layout, wherein the MIM is a module that is instantiated at multiple locations in the circuit design layout;
  - routing a net for one of the instances of the MIM to obtain a routed net, wherein said routing tries to minimize a routing cost function that includes the aggregate boundary-wire-length cost;
  - determining a pin location for a pin based on the routed net; and
  - placing the pin at the pin location in the multiple instances of the MIM.

16. The apparatus of claim 15, wherein the aggregate boundary-wire-length cost is equal to the maximum of the multiple boundary-wire-length costs.

17. The apparatus of claim 15, wherein the aggregate boundary-wire-length cost is equal to a weighted sum of the multiple boundary-wire-length costs.

18. The apparatus of claim 15, wherein each boundary-wire-length cost is based on a set of cost components that include one or more of: a bounding box cost component, a congestion cost component, a routing blockage cost component, and a pin blockage cost component.

19. The apparatus of claim 15, wherein each boundary-wire-length cost is equal to the maximum of the set of cost components.

20. The apparatus of claim 15, wherein each boundary-wire-length cost is equal to a weighted sum of the set of cost components.

21. A non-transitory computer-readable storage medium storing instructions that, when executed by a computer, cause the computer to perform a method for performing multiple-instantiated-module (MIM) aware pin assignment, the method comprising:
- determining an initial set of pin-alignment constraints in a circuit design layout;
- propagating the initial set of pin-alignment constraints through one or more instances of one or more MIMs in the circuit design layout, wherein the MIM is a module that is instantiated at multiple locations in the circuit design layout; and
- performing pin assignment on MIMs in decreasing order of the number of pin-alignment constraints that are imposed on the MIMs.

22. The non-transitory computer-readable storage medium of claim 21, wherein said propagating involves:
- determining that a first pin of a first instance of a first MIM has a pin-alignment constraint;
- propagating the pin-alignment constraint to a second pin of a second instance of the first MIM that corresponds to the first pin;
- identifying a third pin on a partition, a block, or an instance of a second MIM that is to be electrically connected to the second pin; and
- propagating the pin-alignment constraint to the third pin.

23. An apparatus, comprising:
- a processor; and
- a non-transitory storage medium storing instructions that, when executed by the processor, cause the apparatus to perform a method for performing multiple-instantiated-module (MIM) aware pin assignment, the method comprising:
  determining an initial set of pin-alignment constraints in a circuit design layout;
  propagating the initial set of pin-alignment constraints through one or more instances of one or more MIMs in the circuit design layout, wherein the MIM is a module that is instantiated at multiple locations in the circuit design layout; and
  performing pin assignment on MIMs in decreasing order of the number of pin-alignment constraints that are imposed on the MIMs.

24. The apparatus of claim 23, wherein said propagating involves:
  determining that a first pin of a first instance of a first MIM has a pin-alignment constraint;
  propagating the pin-alignment constraint to a second pin of a second instance of the first MIM that corresponds to the first pin;
  identifying a third pin on a partition, a block, or an instance of a second MIM that is to be electrically connected to the second pin; and
  propagating the pin-alignment constraint to the third pin.

* * * * *